United States Patent
Rozmaryn

(10) Patent No.: US 9,294,203 B2
(45) Date of Patent: *Mar. 22, 2016

(54) PROBLEM SIGNATURE TERMINAL DIAGNOSIS METHOD AND SYSTEM

(71) Applicant: Hughes Network Systems, LLC, Germantown, MD (US)

(72) Inventor: Jack Rozmaryn, Silver Spring, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/584,694

(22) Filed: Dec. 29, 2014

(65) Prior Publication Data

US 2015/0118955 A1    Apr. 30, 2015

Related U.S. Application Data

(63) Continuation of application No. 13/536,600, filed on Jun. 28, 2012, now Pat. No. 8,923,753.

(51) Int. Cl.

| | |
|---|---|
| *H04B 1/60* | (2006.01) |
| *H04B 17/02* | (2006.01) |
| *H04B 17/40* | (2015.01) |
| *H04B 7/185* | (2006.01) |
| *H04B 17/23* | (2015.01) |

(52) U.S. Cl.
CPC ............ *H04B 17/40* (2015.01); *H04B 7/18515* (2013.01); *H04B 17/23* (2013.01)

(58) Field of Classification Search
CPC .......... H04B 7/18515; H04B 7/18513; H04B 7/195; H04B 7/19
USPC .......................................................... 455/9
See application file for complete search history.

(56) References Cited

U.S. PATENT DOCUMENTS

| | | | |
|---|---|---|---|
| 5,491,791 | A | 2/1996 | Glowny et al. |
| 5,974,032 | A | 10/1999 | Snowden et al. |
| 6,078,810 | A | 6/2000 | Olds et al. |
| 6,445,916 | B1 | 9/2002 | Rahman |
| 6,771,929 | B1 | 8/2004 | Nivens et al. |
| 6,847,817 | B2 | 1/2005 | Hadinger et al. |
| 8,700,957 | B2 | 4/2014 | La Fever et al. |
| 8,923,753 | B2* | 12/2014 | Rozmaryn ............. H04B 17/40 455/12.1 |
| 2003/0050015 | A1 | 3/2003 | Kelly et al. |
| 2003/0054816 | A1* | 3/2003 | Krebs et al. .................. 455/428 |
| 2004/0198237 | A1 | 10/2004 | Abutaleb et al. |
| 2004/0199573 | A1 | 10/2004 | Schwartz et al. |

(Continued)

*Primary Examiner* — Wesley Kim

*Assistant Examiner* — Raj Chakraborty

(74) *Attorney, Agent, or Firm* — K&L Gates LLP

(57) ABSTRACT

Systems and methods for problem signature terminal diagnosis are disclosed. In an example embodiment, measured operational statistics of a satellite terminal of a peer group of satellite terminals are received and converted into normalized operation statistics. Normalized deviations of the operational statistics are determined and compared to the threshold deviations. A diagnosis zone corresponding to a problem signature is determined based on the normalized deviations by determining that coordinates of the normalized deviations are within the diagnosis zone, comparing a ratio based on the normalized deviations to a threshold ratio, or comparing a differential of the normalized deviations to a threshold differential. A satellite terminal is diagnosed with a problem defined by the problem signature based on the determined diagnosis zone.

26 Claims, 8 Drawing Sheets

(56) References Cited

U.S. PATENT DOCUMENTS

| | | |
|---|---|---|
| 2006/0084377 A1 | 4/2006 | Lee et al. |
| 2008/0055152 A1 | 3/2008 | Hudson et al. |
| 2010/0150017 A1 | 6/2010 | Choo |
| 2010/0223491 A1 | 9/2010 | Ladd et al. |
| 2011/0143654 A1* | 6/2011 | Mukhija .......................... 455/9 |
| 2014/0004789 A1 | 1/2014 | Rozmaryn |
| 2014/0004790 A1 | 1/2014 | Rozmaryn |

* cited by examiner

US 9,294,203 B2

PROBLEM SIGNATURE TERMINAL DIAGNOSIS METHOD AND SYSTEM

CROSS REFERENCE TO RELATED APPLICATIONS

This application is a continuation application that claims priority to and the benefit of U.S. application Ser. No. 13/536,600, filed Jun. 28, 2012, and which relates to the following patent applications: "Terminal Diagnosis Self Correction Method and System," filed on Jun. 28, 2012, U.S. application Ser. No. 13/536,610, and "Peer Group Diagnosis Detection Method and System," filed on Jun. 28, 2012, U.S. application Ser. No. 13/536,604, the entire contents of each of which are incorporated by reference herein.

BACKGROUND

Wireless communication systems typically include a plurality of user terminals that are used by customers or end users which transmit and receive data from satellites and/or other antennas. For a satellite based communication system, a satellite terminal is typically set up at the user location by a service technician or installer. For example, a user's home may have a satellite dish installed for receiving internet, telephone, and television service, or the like. The satellite dish is installed with associated hardware, such as a transmitter, receiver, modem, router, set-top box, and the like. The service technician configures the terminal for optimal use, for example, by correctly orienting the satellite dish, configuring all settings appropriately, and testing the terminal to ensure it is working properly before leaving the installation.

Typically, when a customer of a satellite communication system has a problem with the service (e.g., service interruption, pixilation, slow internet), the customer calls a customer service hotline and speaks with a customer service representative. The customer service representative may attempt to diagnose the problem and determine if any repair is needed, or determine that the service interruption is caused by weather conditions or a regional service interruption. Statistical measurement data from the satellite terminal may be obtained for analysis to determine if there is a problem. A diagnostic tool may be used by the customer service representative, and using the customer's interaction with the customer service representative and/or statistical measurement data, an initial diagnosis me be determined. However, a diagnostic tool typically provides an initial diagnosis which may lack specificity and/or certainty, which may lead to inefficiencies in repairs.

SUMMARY

The present disclosure provides a new and innovative method and system for problem signature terminal diagnosis. In an example embodiment, measured operational statistics of a satellite terminal of a peer group of satellite terminals are received and converted into normalized operation statistics. Normalized deviations of the operational statistics are determined and compared to the threshold deviations. A diagnosis zone corresponding to a problem signature is determined based on the normalized deviations by determining that coordinates of the normalized deviations are within the diagnosis zone, comparing a ratio based on the normalized deviations to a threshold ratio, or comparing a differential of the normalized deviations to a threshold differential. A satellite terminal is diagnosed with a problem defined by the problem signature based on the determined diagnosis zone.

Additional features and advantages of the disclosed system, methods, and apparatus are described in, and will be apparent from, the following Detailed Description and the Figures.

DETAILED DESCRIPTION OF EXAMPLE EMBODIMENTS

Figure 1:
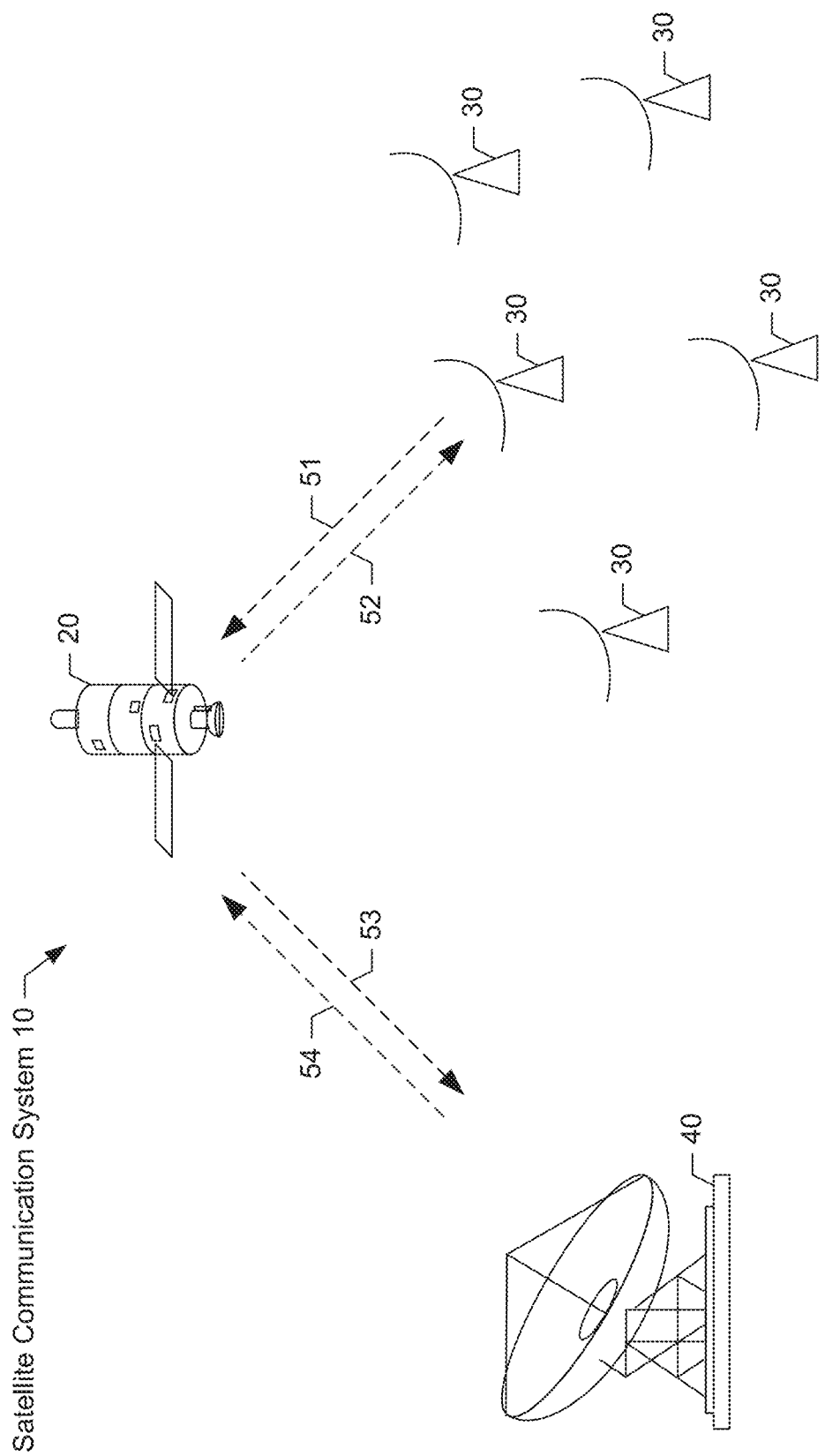
FIG. 1 is a high level block diagram of an example satellite communication system, according to an example embodiment of the present disclosure.

A high level block diagram of an example satellite communication system 10 is illustrated in FIG. 1. The illustrated system 10 includes a satellite 20 and satellite terminals 30, each including an antenna and associated hardware (e.g., receiver, transmitter, modem, router, computing device). The satellite terminals 30 may transmit and receive data to and from the satellite 20. Typically, a satellite 20 receives data from a hub terminal 40 which is distributed to many satellite terminals 30. It should be appreciated that a satellite terminal 30 may communicate with one or more satellites 20. Similarly, a satellite 20 may communicate with one or more hub terminals 40, and a hub terminal 40 may communicate with one or more satellites 20. Typically, a satellite 20 communicates with each satellite terminal 30 using an uplink channel 51 and a downlink channel 52, and also communicates with a satellite hub 40 using a downlink channel 53 and an uplink channel 54. The uplink channel 54 and downlink channel 52 may be referred to as a forward channel while the uplink channel 51 and downlink channel 53 may be referred to as a return channel. It should be appreciated that the uplink channels 51, 54 and downlink channels 52, 53 typically each operate in different frequency bands and with totally independent circuitry. Accordingly, for example, a satellite terminal 30 typically may transmit data on the uplink channel 51 at a first frequency and receive data on the downlink channel 52 at a second frequency. For a satellite terminal 30, the performance of the uplink channel 51 and the downlink channel 52 are typically both separately evaluated in determining a site diagnosis, as uplink data and downlink data each provide insight into any problems which may exist for the satellite terminal 30.

It should be appreciated that in order for a satellite 20 to communicate with a satellite terminal 30, the satellite terminal 30 must be configured correctly with a proper line of sight to the satellite 20. The satellite communication system 10 may be operating in any broadband network, for example, the $K_a$ band, the $K_u$ band, the C band, or the like. For example, satellite communication system 10 may be implemented on the SPACEWAY® and/or JUPITER™ platform. Accordingly, the system 10 may provide satellite coverage over a smaller area or larger area, for example, regional coverage may be dozens or hundreds of miles wide. Also, for example, the system 10 may provide continental coverage.

If the antenna alignment of the satellite terminal 30 is not within a certain tolerance, transmission and/or reception of data may degrade and/or fail. However, even with proper antenna alignment, a satellite terminal 30 may have reception or transmission problems due to environmental issues such as inclement weather conditions. For example, rain fade is a common problem for certain frequency ranges (e.g., the $K_a$ band). Also, other interference sources, such as structures which may block a satellite terminal's 30 line of sight, may impede communication. Further, problems with terminal components and/or settings may cause signal degradation or failure. Components may fail or degrade for a variety of reasons (e.g., physical structural damage, short circuit). In some cases, a particular satellite terminal 30 may be experiencing multiple different problems simultaneously. Moreover, there are many potential causes of suboptimal communication for a satellite terminal 30, and it is often difficult to correctly diagnose the specific problem or problems a satellite terminal 30 may need corrected. Accordingly, for an operator of a satellite communication system 10, it may be highly advantageous to improve the accuracy of terminal diagnosis when a satellite terminal 30 is experiencing a problem with service. Also, it may be advantageous to detect a problem before a customer notices any interruption or decline in service quality.

It should be appreciated that satellite terminals 30, which may also be known as user terminals, earth terminals, ground stations, antenna sites, or the like, may be referred to in the present application simply as terminals or sites. Similarly, the terms customer service representative, customer service agent, and service agent may be used interchangeably in the present disclosure. Likewise, installer, service technician, repair technician, onsite technician and technician may be used interchangeably in the present disclosure. Also, customer, end user, and user may be used interchangeably in the present disclosure. Further, it should be appreciated that, the present application may provide example embodiments relating to a satellite based communication system 10 as illustrated in FIG. 1, however, the present disclosure may be similarly applicable to other wireless communication systems.

Figure 2:
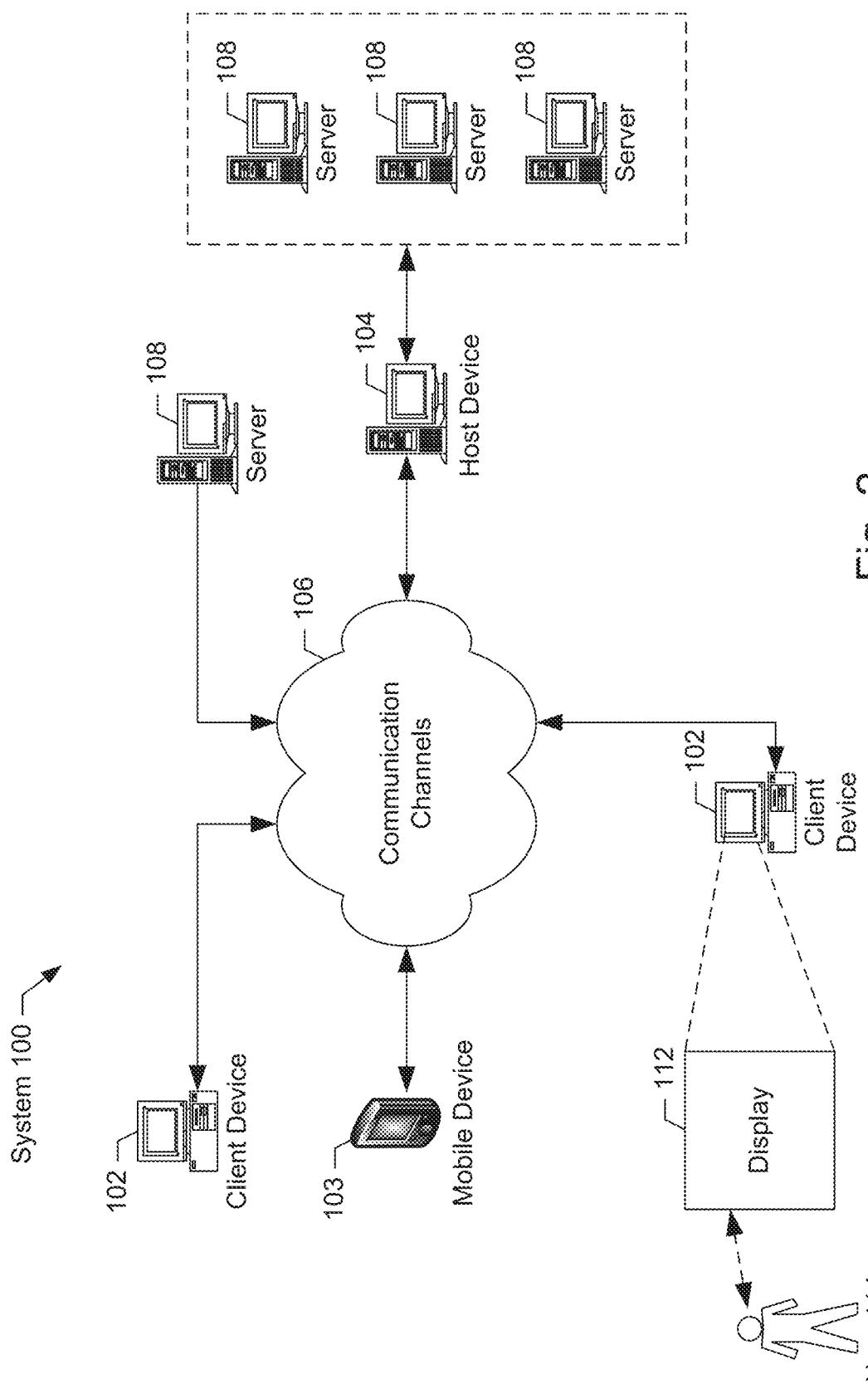
FIG. 2 is a high level block diagram of an example communication system, according to an example embodiment of the present disclosure.

A high level block diagram of an example network communications system 100 is illustrated in FIG. 2. The illustrated system 100 includes one or more client devices 102, one or more host devices 104, and one or more communication channels 106 (e.g., satellite communication). In a satellite communication system 10, the communication channels 106 include communication via the air interface between a hub terminal 40 and a satellite 20, and the satellite 20 and a satellite terminal 30. Also, for example, the hub terminal 40 may communicate with a host device 104 (e.g., content provider) and the satellite terminal 30 may communicate with a client device 102 (e.g., personal computer). Likewise, a hub terminal 40 and/or satellite terminal 30 may communicate with devices and/or networks that are not satellite based systems or not wireless (e.g., a local area network).

The system 100 may include a variety of client devices 102, such as desktop computers, televisions, and the like, which typically include a display 112, which is a user display for providing information to users 114, and various interface elements as will be discussed in further detail below. A client device 102 may be a mobile device 103, which may be a laptop computer, a tablet computer, a cellular phone, a personal digital assistant, etc. The client devices 102 may communicate with the host device 104 via a connection to one or more communications channels 106 such as the Internet or some other data network, including, but not limited to, any suitable wide area network or local area network. It should be appreciated that any of the devices described herein may be directly connected to each other instead of over a network. Typically, one or more servers 108 may be part of the network communications system 100, and may communicate with host servers 104 and client devices 102.

One host device 104 may interact with a large number of users 114 at a plurality of different client devices 102. Accordingly, each host device 104 is typically a high end computer with a large storage capacity, one or more fast microprocessors, and one or more high speed network connections. Conversely, relative to a typical host device 104, each typical client device 102 may often include less storage capacity, a single microprocessor, and a single network connection. It should be appreciated that a user 114 as described herein may include any customer, person, or entity which uses the presently disclosed system and may include a wide variety of parties for both business use and personal use.

Typically, host devices 104 and servers 108 store one or more of a plurality of files, programs, databases, and/or web pages in one or more memories for use by the client devices 102, and/or other host devices 104 or servers 108. A host device 104 or server 108 may be configured according to its particular operating system, applications, memory, hardware, etc., and may provide various options for managing the execution of the programs and applications, as well as various administrative tasks. A host device 104 or server may interact via one or more networks with one or more other host devices 104 or servers 108, which may be operated independently. For example, host devices 104 and servers 108 operated by a separate and distinct entities may interact together according to some agreed upon protocol.

Figure 3:
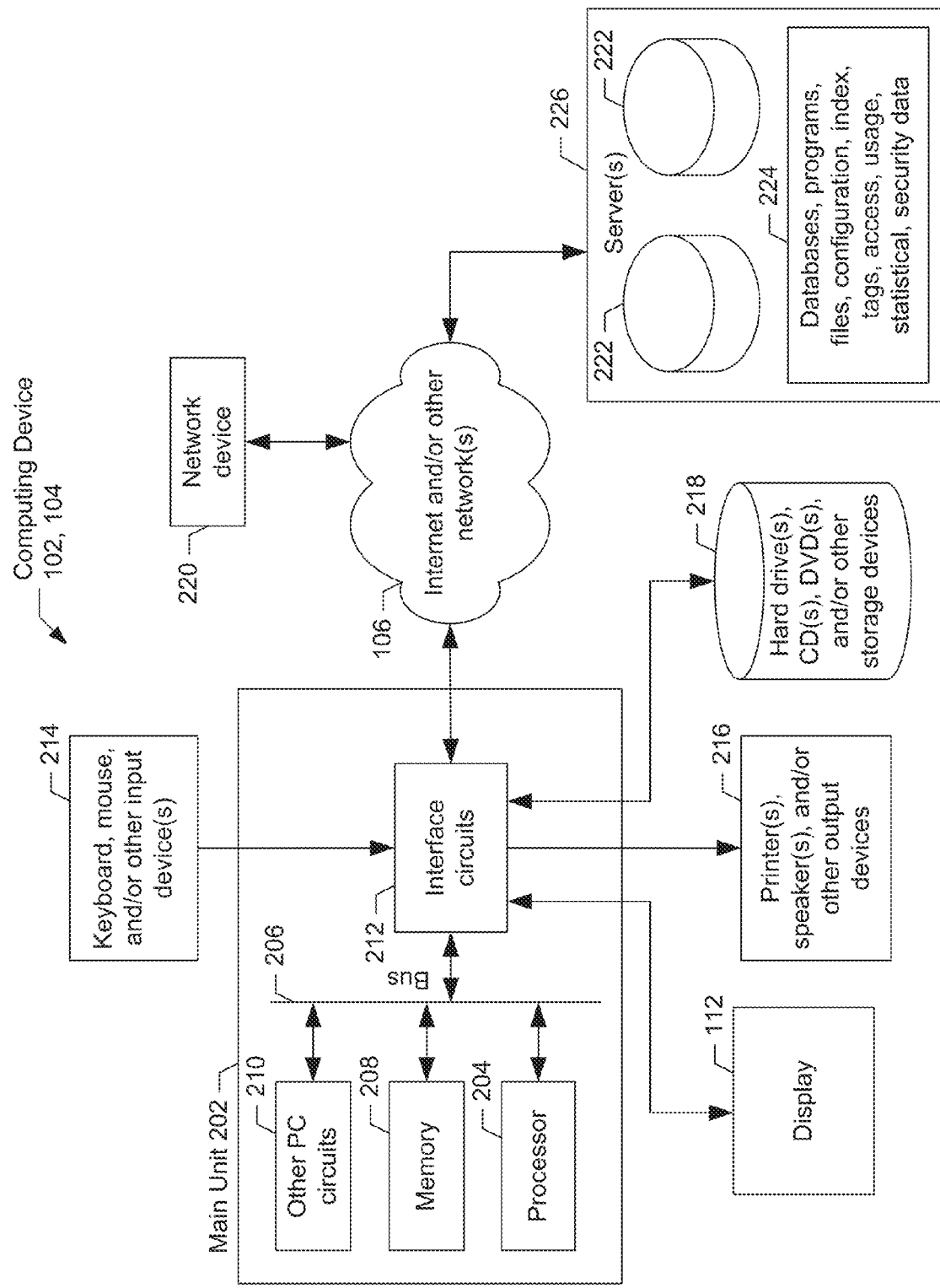
FIG. 3 is a detailed block diagram of an example a computing device, according to an example embodiment of the present disclosure.

A detailed block diagram of the electrical systems of an example computing device (e.g., a client device 102, a host device 104) is illustrated in FIG. 3. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. In an example embodiment, memory 208 may be part of a "cloud" such that cloud computing may be utilized by a computing devices 102, 104. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/ or a Universal Serial Bus (USB) interface. One or more input devices 214 may be connected to the interface circuit 212 for entering data and commands into the main unit 202. For example, the input device 214 may be a keyboard, mouse, touch screen, remote control, track pad, track ball, isopoint, image sensor, character recognition, barcode scanner, microphone, and/or a speech or voice recognition system.

One or more displays 112, printers, speakers, and/or other output devices 216 may also be connected to the main unit 202 via the interface circuit 212. The display 112 may be a cathode ray tube (CRTs), a liquid crystal display (LCD), or any other type of display. The display 112 generates visual displays generated during operation of the computing device 102, 104. For example, the display 112 may provide a user interface that may display one or more web pages received from a computing device 102, 104. A user interface may typically include prompts for human input from a user 114 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as image data, video data, audio data, tag data, historical access or usage data, statistical data, security data, etc., which may be used by the computing device 102, 104.

The computing device 102, 104 may also exchange data with other network devices 220 via a connection to communication channel 106. Network devices 220 may include one or more servers 226, which may be used to store certain types of data, and particularly large volumes of data which may be stored in one or more data repository 222. A server 226 may include any kind of data 224 including databases, programs, files, libraries, configuration data, index or tag data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the system 100. For example, servers 226 may be operated by various different entities. Also, certain data may be stored in a client device 102 which is also stored on the server 226, either temporarily or permanently, for example in memory 208 or storage device 218. The network connection may be any type of network connection, for example, wireless connection, satellite connection, Bluetooth connection, Ethernet connection, digital subscriber line (DSL), telephone line, coaxial cable, etc.

Figure 4:
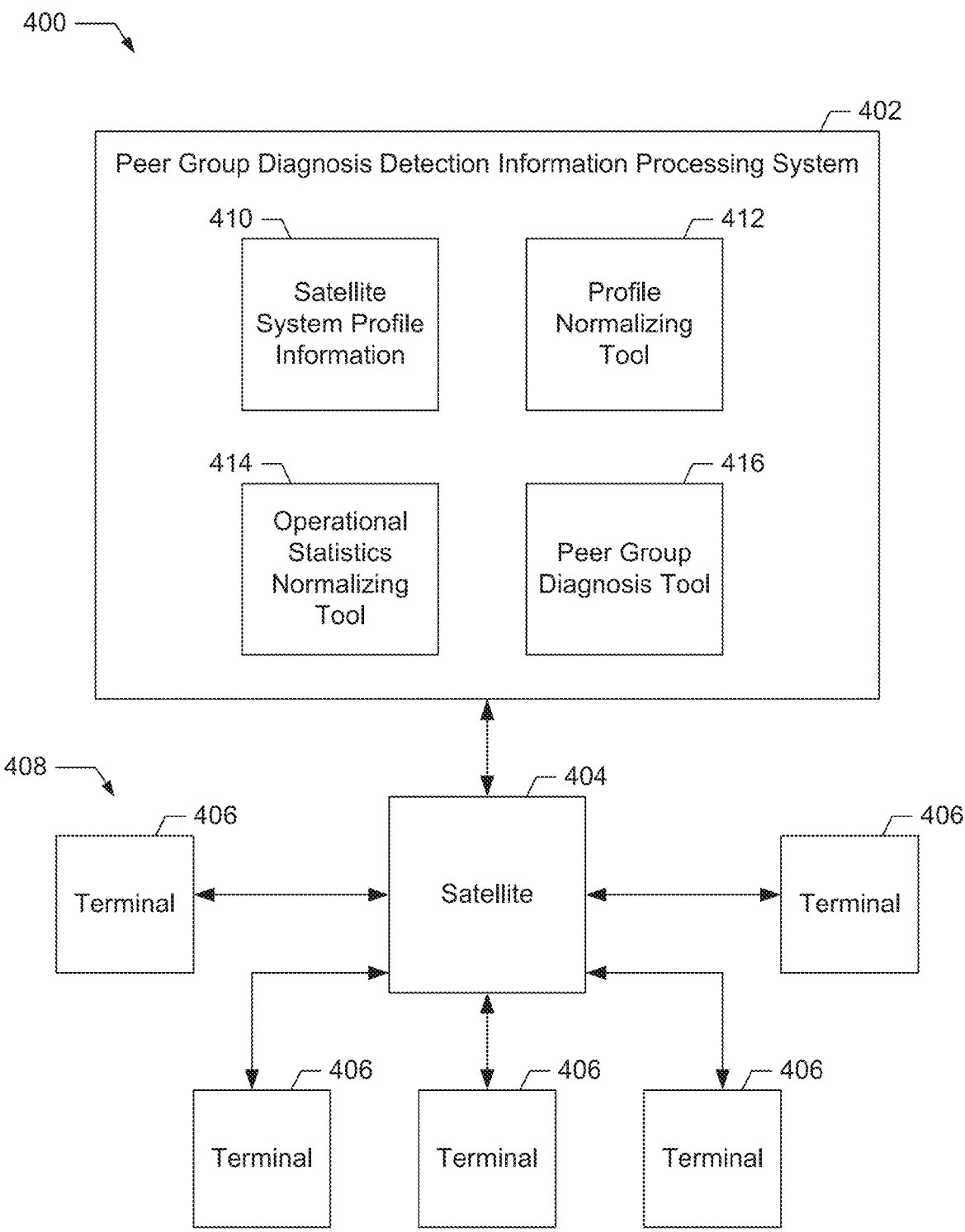
FIG. 4 is a block diagram of an example peer group diagnosis detection system, according to an example embodiment of the present disclosure.

FIG. 4 is a block diagram of an example peer group diagnosis detection system 400. The peer group diagnosis detection system 400 may include a peer group diagnostic information processing system 402, a satellite 406, a plurality of terminals 406, and a peer group 408. The terminal diagnostic information processing system 402 include satellite system profile information 410, a profile normalizing tool 412, an operational statistics normalizing tool 414, and a peer group diagnosis tool 416. It should be appreciated that the respective diagram blocks of FIG. 4 may represent one or more physical devices for ease of understanding.

A peer group diagnosis detection information processing system 402 may be used, for example, by a company that provides satellite services, such as television, internet, telephone, etc., to customers, including home use customers, commercial businesses, and the like. The peer group diagnosis detection information processing system 402 is used to detect problem terminals 406 by diagnosing terminals 406 within a peer group 408, for example, as good, degraded, or bad. The peer group diagnosis detection information processing system 402 may be implemented at a diagnostic center. The satellite 404 may communicate with the peer group diagnosis detection information processing system 402 to provide data from terminals 406 in the peer group 408. The satellite 404 may communicate with the peer group diagnosis detection information processing system 402 and terminals 406, for example, as discussed above. It should be appreciated that many terminals 406 (e.g., hundreds or thousands) may be part of a peer group 408, and likewise, many satellites 406 and/or peer groups 408 may be included in a peer group diagnosis detection system 400.

The peer group diagnosis detection information processing system 402 may include a database, files, or the like with satellite system profile information 410. The satellite system profile information typically includes satellite beam profiles, satellite terminal profiles, and various other information regarding satellites 404 and terminals 406. The satellite system profile information may be used to determine peer groups 408. A profile normalizing tool 412 may be used to normalize a baseline profile for a peer group 408. An operational statistics normalizing tool 414 may be used to normalize operational statistics (e.g., signal to noise ratio, symbol rate) which may be measured at terminals 406 of the peer group 408. A peer group diagnosis tool 416 is used to diagnose terminals 406 of the peer group 408 based on the normalized operational statistics.

Figure 5:
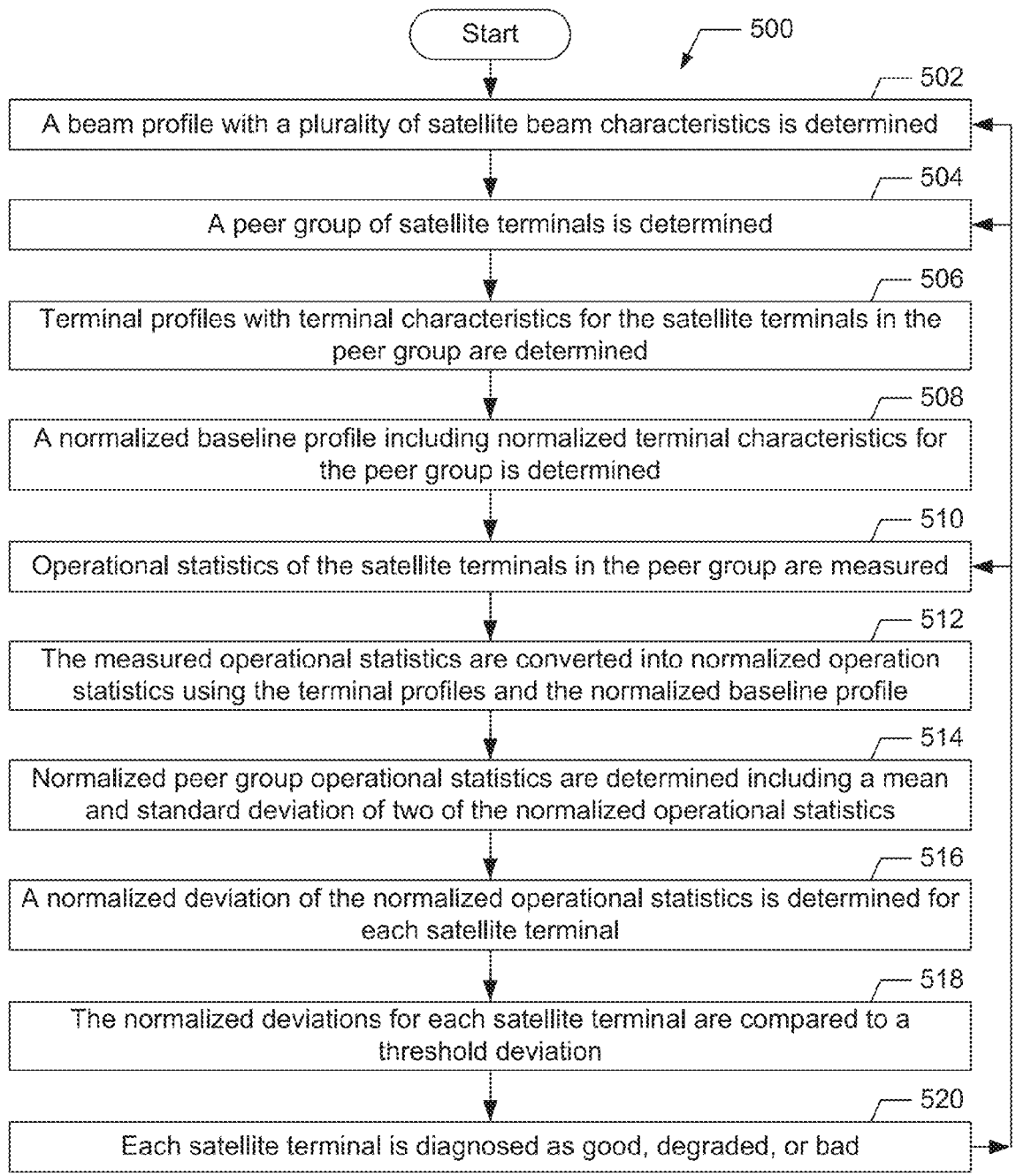
FIG. 5 includes a flowchart illustrating an example process for peer group diagnosis detection, according to an example embodiment of the present disclosure.

FIG. 5 includes a flowchart of an example process 500 for peer group diagnosis detection. Although the process 500 is described with reference to the flowchart illustrated in FIG. 5, it will be appreciated that many other methods of performing the acts associated with the process 500 may be used. For example, the order of many of the blocks may be changed, many blocks may be intermittently repeated or continually performed, certain blocks may be combined with other blocks, and many of the blocks described are optional or may only be contingently performed.

The example process 500 may begin when a beam profile with a plurality of satellite beam characteristics is determined (block 502). For example, a beam profile for a satellite beam may include characteristics such as carrier frequency, beam transmission power (e.g., Effective Isotropic Radiated Power or EIRP), the geolocation information on the beam including the center point or common point, the size and attenuation pattern of the beam, antenna gain, signal to noise ratio, modulation type, bit rate, tolerances, etc. It should be appreciated that a satellite beam is not uniform as measured from the ground, and that a common point generally located at the center of the beam may have the maximum downlink gain and maximum uplink sensitivity. In an example embodiment, satellite beam may be part of a communication system operating in any broadband network, for example, using the $K_a$ band on the SPACEWAY® platform.

A peer group of satellite terminals is determined (block 504). For example, a peer group may include all the terminals using a particular beam and transponder. Also, for example, if a beam has a large coverage area, a peer group may include all of the terminals located within a block defined by a certain upper and lower latitude and longitude. It should be appreciated that a peer group may be determined based on a variety of other factors, for example, geological structures, weather patterns, other boundaries, or the like. A peer group may typically include hundreds or thousands of terminals.

Terminal profiles with terminal characteristics for the satellite terminals in the peer group are determined (block 506). For example, for each terminal, the terminal characteristics may include all relevant hardware specifications and the geolocation coordinates (e.g., latitude and longitude) and/or the location from the beam center (e.g., in radial ground distance or radial angle from the beam center). Hardware specifications may include antenna type and size, a transmission power, an antenna gain, a signal to noise ratio, a symbol rate, and any other specifications relevant to the configuration of a terminal.

A normalized baseline profile including normalized terminal characteristics for the peer group is determined (block 508). For example, a normalized baseline profile may be determined as a specific hardware configuration at a specific location, such as at the beam center. For example, the hardware configuration may be a 1 watt transmitter, a 0.74 meter dish, a symbol rate of 256 ksps, etc. It should be appreciated that the normalized baseline profile may typically represent a common hardware configuration at the beam center. In an example embodiment, at the center of the beam, a terminal may have an expected uplink signal to noise ratio (Es/No) of approximately 15 dB and an expected downlink Es/No of approximately 22 dB. These expected Es/No values may represent an optimally configured terminal in optimal conditions. However, terminals located away from the beam center may have attenuated Es/No values under optimal conditions even when optimally configured. For example, an installing technician may set up a terminal with all the proper equipment, proper align the antenna, etc., and if the terminal is near the edge of the satellite beam, the expected Es/No values may be lower, and thus, more susceptible to service interruptions from weather conditions or the like. Because the optimal operational values (e.g., downlink Es/No) are different for terminals with different hardware configurations and/or locations, a comparison of operational statistics between the different terminals is often of limited value.

Operational statistics of the satellite terminals in the peer group are measured and received (block 510). For example, any or all uplink and downlink statistics may be measured at the terminal, including any raw RF statistics or such as Es/No, G/T, transmission power, reception power or other data statistics such as symbol rate, CRC error rates, latency values, packet loss ratio, throughput speeds, or response times. The operational statistics may be continuously measured or intermittently measured, for example, on a daily or hourly basis, or any other time interval. The measured operational statistics may then be transmitted on a regular basis to a remote location for peer group diagnosis detection, for example, hourly, daily, weekly, or on a continuous basis.

The measured operational statistics are converted into normalized operation statistics using the terminal profiles and the normalized baseline profile (block 512). For example, each of the measured operational statistics is adjusted to normalize each terminal to the normalized baseline profile expected or measured operational statistics. In an example embodiment, converting the measured uplink and downlink signal to noise ratios includes adjusting the measured values by adding an uplink normalization value and a downlink normalization value specific to each satellite terminal based on an antenna size, a transmission power, an antenna gain, and a distance from a satellite beam center point. Accordingly, once the measured operational statistics are converted into normalized operation statistics, the data represents a group of peer terminals that have the same equipment configuration and same location. For example, if a transmitting power of a terminal is less than the transmitting power of the transmitting power of the normalized baseline profile, a value to account for this difference may be added to the uplink Es/No. Similarly, if a terminal is 50 miles from the center the satellite beam, a value accounting for this difference may be added to the uplink and downlink Es/No. Thus, all the terminals normalized operation statistics should generally be the same, except for variations due to varying cable lengths, equipment variations, measurement errors, and other various interference, which would typically be relatively minor. Thus, when a terminal's normalized operation statistics deviate beyond the ordinary variation levels, a problem is indicated.

Normalized peer group operational statistics are determined including a mean and standard deviation of at least two of the normalized operational statistics (block 514). For example, the normalized peer group operational statistics may have an uplink mean Es/No of 12 dB, a downlink mean of Es/No of 17.5 dB, with an uplink Es/No standard deviation of 2, and a downlink Es/No standard deviation of 2.5. In an example embodiment, a site count associated with the peer group is included with the normalized peer group operational statistics. It should be appreciated that the normalized peer group operational statistics may vary based on the particular communication system, the satellite and terminals, the frequency band, the antenna types, and various other variables. It should be appreciated that determining peer group operational statistics from the terminal normalized operational statistics may include outlier removal, or other manipulation for statistical purposes. For example, any uplink or downlink signal to noise ratio that has a deviation greater than 1.3 standard deviations from the peer group mean may be removed from the data set to obtain a revised mean and standard deviation of the remaining terminals. Accordingly, any outliers may be removed to ensure that the normalized peer group operational statistics are representative of a normally functioning terminal. Also, other operational statistics besides the uplink and downlink signal to noise ratio may be normalized for the peer group in a similar fashion. For example, symbol rate, latency values, error rates, throughput speeds, signal strength, or any signal or performance quality metric, may advantageously be used as normalized peer group operational statistics, alone, or in conjunction with other statistics.

A normalized deviation of at least two operational statistics is determined for each satellite terminal (block 516). For example, using the normalized peer group operational statistics, a normalized uplink Es/No deviation and a normalized downlink Es/No deviation may be determined for each terminal in the peer group. For example, the normalized uplink and downlink Es/No deviations of a given terminal may be UL$-0.6\sigma$ and DL$-0.8\sigma$. It should be appreciated that the normalized deviation may be expressed in units other than standard deviations ($\sigma$), for example, in decibels (dB). In this example embodiment, the normalized deviations may be expressed, for example, as UL$-1.2$ dB and DL$-20$ dB instead of UL$-0.6\sigma$ and DL$-0.8\sigma$. Other typical examples of normalized deviations for terminals in the example peer group may be as follows: UL$-1.5\sigma$ and DL$-0.2\sigma$; UL$-2.1\sigma$ and DL$+0.4\sigma$; UL$+1.2\sigma$ and DL$-0.5\sigma$; UL$+0.3\sigma$ and DL$+1.1\sigma$.

The normalized deviations for each satellite terminal are compared to a threshold deviation (block 518). In an example embodiment, each normalized uplink and downlink deviation may be compared to a threshold of $-2.5\sigma$. In an example embodiment, each normalized uplink and downlink deviation may be compared to a threshold of $-4.0\sigma$. It should be appreciated that a value of a threshold deviation may depend largely on the communication system. Also, multiple threshold deviations may used for comparison for each normalized deviation of each terminal, or each normalized deviation may only be compared to a single threshold deviation.

Figure 6:
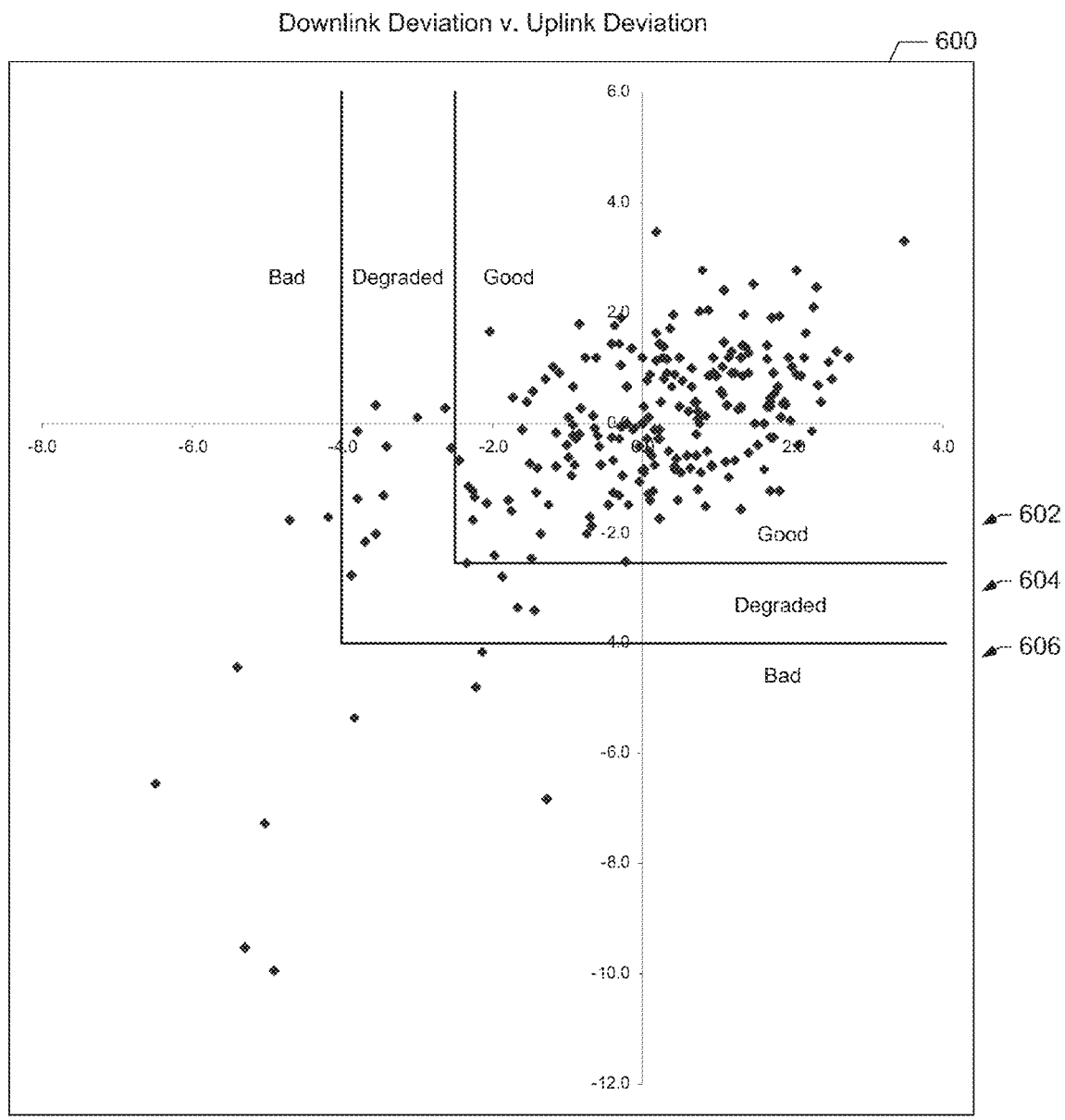
FIG. 6 includes a scatter diagram illustrating an example data set for peer group diagnosis detection, according to an example embodiment of the present disclosure.

Each satellite terminal is diagnosed as good, degraded, or bad (block 520). For example, when a terminal's normalized uplink and downlink deviations are above the threshold of −2.5σ, the terminal may be diagnosed as good or OK. When either of a terminal's normalized uplink and downlink deviations is below the threshold of −4.0σ, the terminal may be diagnosed as bad, and likely in need of service. When either of a terminal's normalized uplink and downlink deviations is below the threshold of −2.5σ, and both of a terminal's normalized uplink and downlink deviations are above the threshold of −4.0σ, the terminal is diagnosed as degraded. As discussed below, FIG. 6 illustrates an example scatter diagram illustrating such an exemplary diagnosis of terminals. It should be appreciated that the thresholds may be used to differentiate varying degrees of problem severity, such as by differentiating between merely degraded terminals and bad terminals. Typically, for example, a bad terminal may provide significant service interruptions while a degraded terminal may provide limited service interruptions which may not even be noticeable to the customer or a reduction in internet throughput speed and response times for both the uplink and downlink. However, the threshold(s) may be adjusted for each communication system to provide a diagnosis as needed. For example, if a terminal is merely degraded, no action may be required, however, if the customer calls to complain about poor service, there is already data confirming that the service is not optimal and may be improved with a service call to optimize the terminal. Also, for example, if a terminal is bad, the service provider may contact the customer and schedule an appointment to repair and optimize the terminal, which may improve customer relations. In an example embodiment, newly installed terminals may have their performance validated to ensure that installation technicians are properly installing terminals.

FIG. 6 includes a scatter diagram 600 illustrating an example data set of terminal deviations for peer group diagnosis detection. The scatter diagram 600 plots the normalized deviations for the satellite terminals of a peer group, with the x-axis representing the normalized uplink deviation and the y-axis representing the normalized downlink deviation, such that each data point illustrates the normalized uplink and downlink deviations for a satellite terminal. As discussed above, the threshold deviations may be used to diagnose the terminals in the peer group as good, degraded, or bad. FIG. 6 illustrates diagnosis zones 602, 604, 606, which are presented on the two dimensional scatter diagram for ease of understanding. The deviation thresholds of −2.5σ and −4.0σ separate the good zone 602, the degraded zone 604, and the bad zone 606. Accordingly, terminals which have normalized deviations falling in the good zone 602 are diagnosed as good, terminals which have normalized deviations falling in the degraded zone 604 are diagnosed as degraded, and terminals which have normalized deviations falling in the bad zone 602 are diagnosed as bad. It should be appreciated that using a scatter diagram is not necessary to make a diagnosis, but FIG. 6 is informative in that it illustrates that the normalized deviations for the terminals in the peer group may be advantageously compared regardless of hardware configuration and location differences. Also, for example, using the normalized deviations provides for improved performance when a rain fade occurs within the peer group. Generally, the entire peer group will experience a signal degradation, so a properly working terminal will not show any degradation relative to the peer group because the peer group is being subjected to rain fade collectively, so there will typically not be any change in the normalized deviation.

Figure 7:
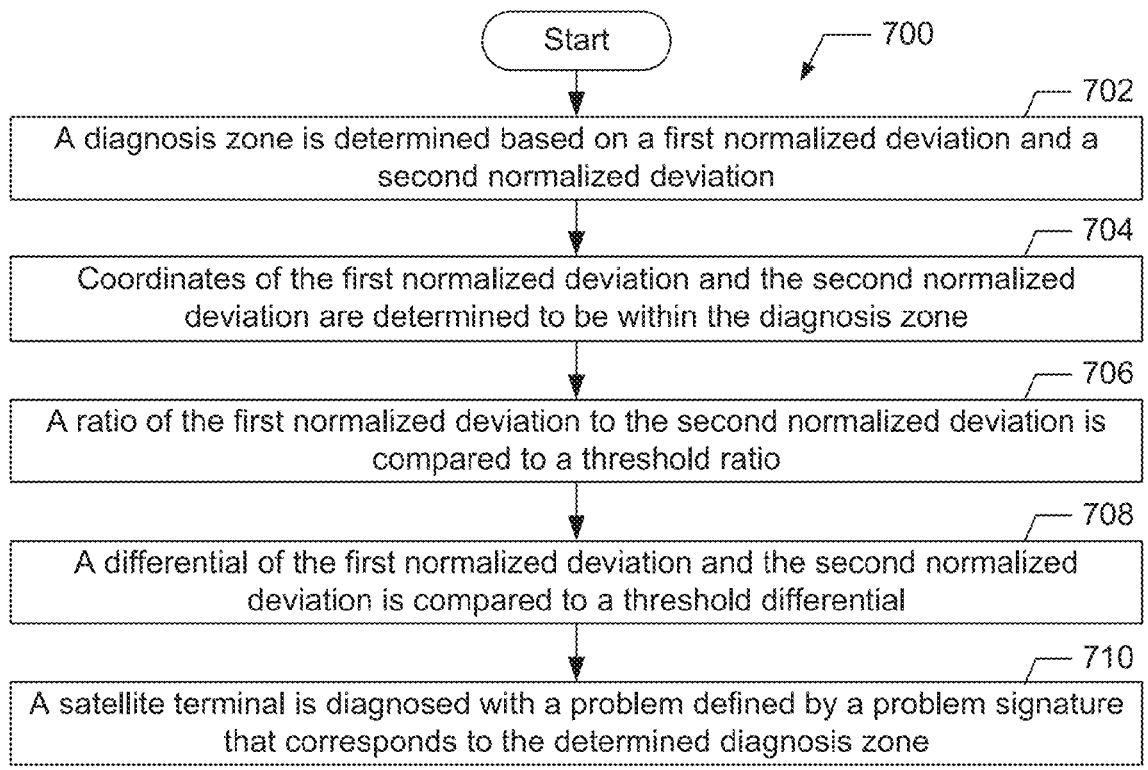
FIG. 7 includes a flowchart illustrating an example process for problem signature terminal diagnosis, according to an example embodiment of the present disclosure.

FIG. 7 includes a flowchart of an example process 700 for problem signature terminal diagnosis. Although the process 700 is described with reference to the flowchart illustrated in FIG. 7, it will be appreciated that many other methods of performing the acts associated with the process 700 may be used. For example, the order of many of the blocks may be changed, many blocks may be intermittently repeated or continually performed, certain blocks may be combined with other blocks, and many of the blocks described are optional or may only be contingently performed.

A diagnosis zone is determined based on a first normalized deviation and a second normalized deviation (block 702). For example, an alignment problem diagnosis zone may correspond to a data point for a particular terminal including a normalized uplink Es/No deviation and a normalized downlink Es/No deviation. Other normalized deviations for different operational statistics, such as uplink error rate and downlink error rate, or latency and throughput, may be used instead of or in addition to Es/No deviations. A wide variety of diagnosis zones indicative of problems may be determined depending upon the operational statistics for which the normalized deviations are provided. It should be appreciated that a diagnosis zone may not differentiate between degraded and bad, such that each problem may only be subject to a binary diagnosis that a problem does or does not exist. Also, a diagnosis zone with three or more dimensions may be provided using a third normalized deviation for a different operational statistic, and so forth. One or more of the following blocks 704, 706, and 708 may be used to determine the diagnosis zone.

Figure 8:
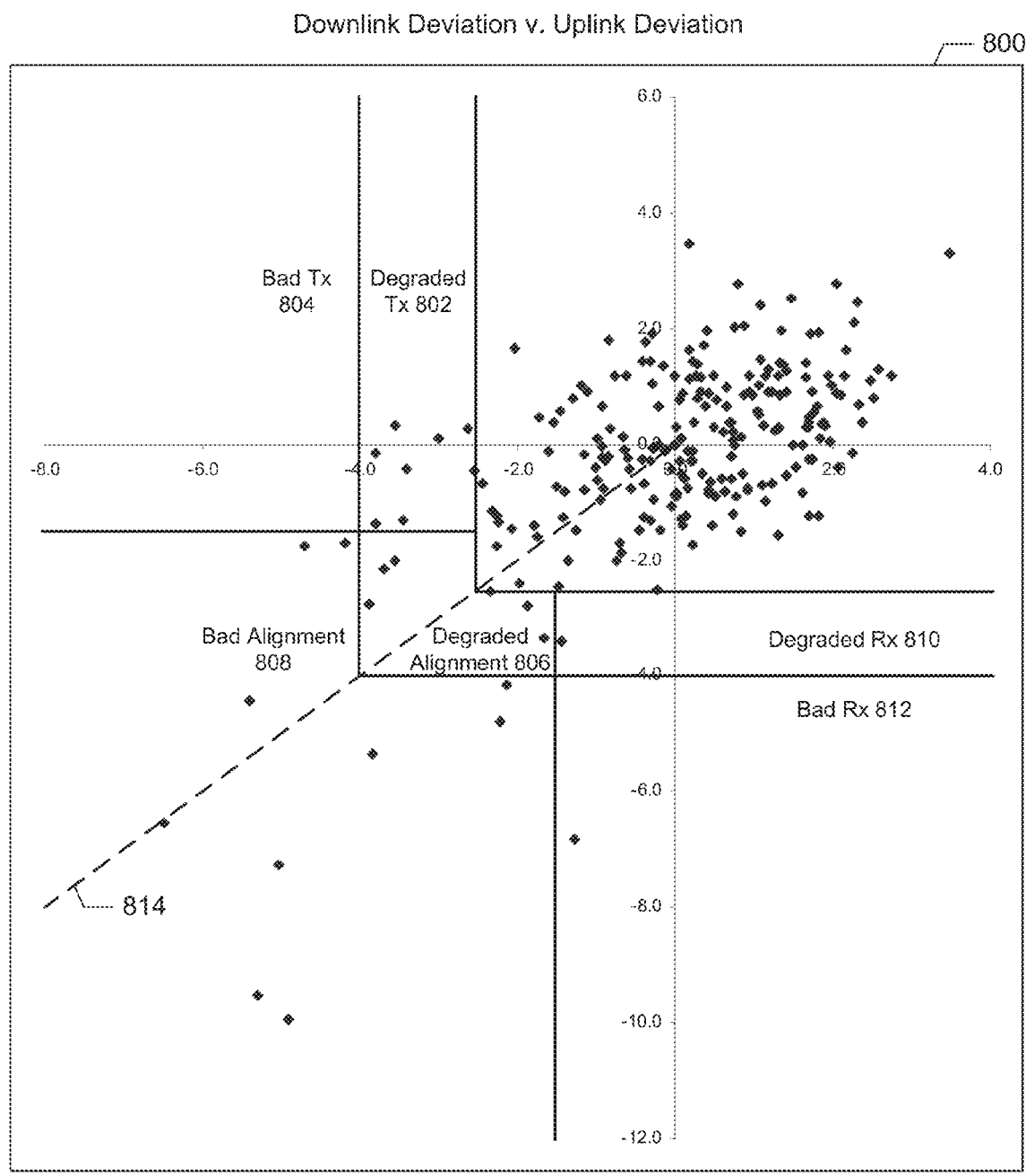
FIG. 8 includes a scatter diagram illustrating an example data set for problem signature terminal diagnosis, according to an example embodiment of the present disclosure.

Coordinates of the first normalized deviation and the second normalized deviation are determined to be within the diagnosis zone (block 704). For example, a terminal having an the data coordinates of uplink deviation of −5σ and downlink deviation of −4σ may fall within the bounds of the alignment problem diagnosis zone, as seen in FIG. 8, discussed below. A ratio of the first normalized deviation to the second normalized deviation is compared to a threshold ratio (block 706). For example, a terminal having an uplink deviation to downlink deviation ratio of approximately 1 may correspond to the alignment problem diagnosis zone. For example, a range of deviation ratios (e.g., 0.6<UL/DL<1.7) may be compared to a terminal's uplink to downlink ratio to determine the alignment problem diagnosis zone. Similarly, a deviation ratio of UL/DL above 1.8 may correspond to the transmitter problem diagnosis zone. Also, a differential of the first normalized deviation and the second normalized deviation is compared to a threshold differential (block 708). For example, a terminal having an uplink deviation which is greater than the downlink deviation by a differential greater than a certain threshold may correspond to the receiver problem diagnosis zone.

A satellite terminal is diagnosed with a problem defined by a problem signature that corresponds to the determined diagnosis zone (block 710). For example, a terminal is diagnosed as having bad alignment based on determining the bad alignment diagnosis zone through one or more of blocks 704, 706, and 708 to meet the problem signature for bad alignment. In an example embodiment, a problem signature is associated with multiple diagnosis zones based on normalized deviations of different operational statistics. Also, a diagnosis zone may be associated with multiple distinct problem signatures. Accordingly, it should be appreciated that a problem signature library may include multiple problem signatures. In an example embodiment, a problem signature may include a timing element. For example, a problem signature for water leakage into a radio may determine a diagnosis zone at a first time, and determine a diagnosis zone at a later time. Then, based on a progression from one diagnosis zone to another over time, the problem signature for water leakage may correspond to the diagnosis zones determined over time. It should be appreciated that when a problem is uncertain, monitoring the problem over time may provide further insight, and allow for a high degree of confidence in determining one problem signature over another for a particular terminal.

Also, a level of confidence in a diagnosis may be provided based on the coordinates location within the diagnosis zone. For example, a data point near the edge of a diagnosis zone may be diagnosed with less confidence than a data point far from the edge of the diagnosis zone. Also, one or more ratios may be used to provide a confidence level. For example, a deviation ratio of UL/DL above 3.0 may be diagnosed as a transmitter problem with a high degree of confidence. Likewise, a differential may be used for determining a confidence level in a diagnosis. It should be appreciated that the specific manner of determining a diagnosis zone may be different when the normalized deviations of different operational statistics are used for determining diagnosis zones. Once a problem signature is determined based on the diagnosis zone(s) and any other relevant information, the diagnosed problem may be fixed. Having a specific diagnosis may often allow for efficient repair the problem, for example, when a repair technician replaces a single component which is determined to be defective or adjusts a part or setting without any component replacement. After repairing the problem, the normalized deviation data used to diagnose the problem may be reviewed to validate that the problem is fixed. For example, reviewing the normalized uplink and downlink deviations of a terminal with poor alignment may show a gradual decrease over time in both the uplink and downlink deviations. However, after a repair technician repeaks or repoints the antenna, the uplink and downlink deviations may improve to within the normal range indicating that the problem has been fixed.

FIG. 8 includes a scatter diagram 800 illustrating an example data set of terminal deviations for problem signature terminal diagnosis. The scatter diagram 800 plots the normalized deviations for the satellite terminals of a peer group, with the x-axis representing the normalized uplink deviation and the y-axis representing the normalized downlink deviation, such that each data point illustrates the normalized uplink and downlink deviations for a satellite terminal. As discussed above regarding FIG. 6, the threshold deviations may be used to diagnose the terminals in the peer group as good, degraded, or bad. Further, the threshold deviations may be used to diagnose the terminals in the peer group as having a problem, for example, relating to a transmitter (Tx), a receiver (Rx), or an alignment issue. FIG. 8 illustrates problem diagnosis zones 802, 804, 806, 808, 810, 812 which are presented on the two dimensional scatter diagram for ease of understanding. The deviation thresholds of −1.5σ, −2.5σ, and −4.0σ bound the degraded transmitter zone 802, the bad transmitter zone 804, the degraded alignment zone 806, the bad alignment zone 808, the degraded receiver zone 810, and the bad receiver zone 812. Accordingly, terminals which have normalized deviations in diagnosis zones 802 or 804 are diagnosed as having a transmitter problem, terminals which have normalized deviations in diagnosis zones 806 or 808 are diagnosed as having an alignment problem, and terminals which have normalized deviations in diagnosis zones 810 or 812 are diagnosed as having a receiver problem. In the example embodiment of FIG. 8, the deviation thresholds of −2.5σ and −4.0σ are similarly provided as discussed above regarding FIG. 6, and the deviation thresholds of −1.5σ bound the alignment problem diagnosis zones 806, 808 between the problem transmitter zones 802, 804 and the problem receiver zones 810, 812.

As discussed above, it should be appreciated that using a scatter diagram is not necessary to make a diagnosis, but FIG. 8 is informative in that it illustrates that the normalized deviations for the terminals in the peer group may be located squarely within a diagnosis zone or near the edge of a diagnosis zone. For example, a dotted correlation line 814 illustrates a correlation between the plotted uplink and downlink deviations. The correlation line 814 runs through the center of the alignment problem diagnosis zones 806, 808. A high correlation between uplink deviation and downlink deviation (i.e., near the dotted line) indicates that a common component (e.g., antenna) has a problem, because both the uplink signal and the downlink signal are affected. An alignment problem is a typical example of a problem when the uplink and downlink deviation is highly correlated, but other common components can cause problems with both the uplink and downlink signals. Common components may include antenna alignment, the antenna dish, cabling, the feedhorn, etc. Accordingly, the terminals having data points provided in the degraded alignment zone 806 or bad alignment zone 808 may not actually have a problem with alignment, for example, when a different problem associated with a common component is present. For example, if the line of sight is partially blocked, the transmission and the reception of data are both affected, with the negative uplink and downlink deviations in the alignment problem diagnosis zones 806, 808. Accordingly, for example, problem signatures may use the diagnosis zones provided in FIG. 8 in conjunction with other diagnosis zones to distinguish various problems which may have certain symptoms in common, or have shared diagnosis zones.

By using a normalized deviation of multiple different operational statistics, associations of correlation may provide a wide range of insight that may indicate or exclude certain problems from diagnosis, based on diagnosis zones, such as those illustrated in FIG. 8, based on ratios or correlations such as correlation line 814, and/or based on differentials between normalized deviations of operational statistics. A correlation or ratio may shed light on the nature of the problem based on the relationship between normalized deviations. For example, terminals with positions near the diagonal dotted line 814 are the most correlated and as the positions deviate from this diagonal line, the correlation decreases. Problem sites with a high correlation indicate a problem with the common elements of the terminal, for example, antenna, installation alignment, common broadcast and receive assemblies. On the other hand, sites exhibiting little or no correlation, or independence, indicate problems with either the receive subsystem or the transmit subsystem depending on the whether uplink or downlink deviation is comparatively large. Transmitter problem sites are associated with a high uplink to downlink deviation ratio, while receiver problem sites are associated with high downlink to uplink deviation ratio.

As noted above, various problematic conditions other than transmitter, alignment, and receiver problems may be determined using a two dimensional normalized deviation chart as shown in FIG. 8. For example, problems such as water ingress into the receiver, line of sight issues, and various alignment type issues may be determined using diagnosis zones as described above. Accordingly, in an example embodiment, normalizing multivariate performance measurements may allow for independent or disjointed metrics to be compared to each other, correlated, and causality may be deduced, if present. For example, operational statistics other than uplink and downlink Es/No which may be used to provide a two dimensional or higher dimensional normalized deviation chart similar to FIG. 8 include latency and throughput.

In an example embodiment, a three dimensional normalized deviation chart may be employed. For example, a normalized downlink Es/No may be plotted on a first axis (e.g., x-axis), a normalized latency deviation may be plotted on a second axis (e.g., y-axis), and a normalized throughput deviation may be plotted on a third axis (e.g., z-axis). The normalized latency deviation and the normalized throughput deviation may be measured with respect to both uplink and downlink. Diagnosis zones may be provided in three dimensions similarly to those discussed above and illustrated in two dimensions. In an example embodiment, thresholds for normalized latency deviation, normalized throughput deviation, and normalized downlink Es/No deviation may be $-4.0\sigma$, or any other suitable value for each specific normalized deviation dimension. If any of the three normalized deviations are beyond the threshold, it may be determined that a problem exists, and a diagnosis zone may be determined.

In an example embodiment, three different two dimensional correlation values may be determined, as well as a three dimensional correlation value for all three normalized deviations. When all three normalized deviations are relatively uncorrelated, and one normalized deviation exceeds its threshold, the diagnosis may be determined based on the normalized deviation which exceeds the threshold. For example, when the normalized latency deviation is below $-4.0\sigma$, and the normalized throughput deviation and the normalized downlink Es/No deviation are both not below the threshold, the diagnosis may be that the terminal is misconfigured. Similarly, when the normalized throughput deviation is below $-4.0\sigma$, the normalized throughput deviation and the normalized downlink Es/No deviation are both not below the threshold, the diagnosis may be that the channel is experiencing user overload. When the normalized downlink Es/No deviation is below $-4.0\sigma$, the normalized throughput deviation and the normalized latency deviation are both not below the threshold, the diagnosis may be that the there is an alignment problem. For example, in a scenario when all three normalized deviations are beyond the threshold and highly correlated (e.g., normalized deviation values of $-5.1\sigma$, $-4.5\sigma$, $-4.8\sigma$), the high latency and low throughput may be caused by the poor downlink signal quality.

Further information may be gleaned from assessing the relationship between normalized deviations in two dimensions. For example, a two dimensional correlation may be found to exist when a ratio of, for example, 0.7 to 1 exists between one normalized deviation and a different normalized deviation that exceeds the threshold. For example, a latency/signal quality correlation greater than 0.7 (e.g., normalized deviation values of $-3.8\sigma$ and $-5.2\sigma$) may indicate that latency is being impacted by a poor signal quality, which may indicate a buffer overload at the terminal. Similarly, throughput/signal quality correlation greater than 0.7 may indicate a high packet loss rate due to poor signal quality. A throughput/latency correlation greater than 0.7 may indicate a high packet loss rate that is not related to low signal quality. It should be appreciated that diagnosis zones or multi-dimensional diagnosis spaces may be determined in a similar fashion as discussed above regarding FIG. 8, and that the present examples are provided merely for descriptive purposes of an example system using three dimensional normalized deviation diagnosis. The present embodiment is not limited to three dimensions, and for example, a normalized uplink Es/No may be further provided in a fourth dimension. Moreover, it should be appreciated that three dimensional, four dimensional, or any greater dimension, analysis need not be provided in a manner suitable for visual analysis, particularly for higher dimension applications.

As discussed above, each diagnosis may include one or more diagnosis zones, including in some instances a multivariate diagnosis zone and/or a timing aspect. In an example embodiment, a problem signature may be provided for an antenna blockage, a problem antenna dish, or water leakage into the receiver/transmitter. Moreover, a problem signature may be defined with multiple independent diagnosis zones using various different operational statistics.

Accordingly, the presently disclosed methods and systems may advantageously detect and diagnose a specific problem before a customer notices any decline in service, thus improving customer service relations. For example, when a service performance issue arises, rather than sending a repair technician to a site blind, the diagnosis information may be provided to the technician prior to performing any work. Such information may advantageously minimize the return of non-faulty equipment that might normally be replaced needlessly. Also, early detection of systemic equipment problems may be found using multivariable normalization and correlating deviations to determine causality. Further, the presently disclosed methods and systems may validate good installations of satellite terminals and minimize repair visits. It should be appreciated that, for example, the rate of unnecessary repair visits may be reduced to less than 0.01% of all repair visits. Accordingly, a great reduction in costs and improvement in customer service may be achieved using the presently disclosed problem signature terminal diagnosis method and system.

For exemplary purposes, the present disclosure discusses a various examples relating to a satellite communication system. However, it should be appreciated that the disclosed system, methods, and apparatus may be advantageously used in various different types of communication systems including, for example, systems that do not use satellites (e.g., a terrestrial point to point communication system).

It will be appreciated that all of the disclosed methods and procedures described herein can be implemented using one or more computer programs or components. These components may be provided as a series of computer instructions on any conventional computer readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Also, it should be appreciated that the features of the dependent claims may be embodied in the systems, methods, and apparatus of each of the independent claims.

The invention is claimed as follows:

1. A method comprising:
   receiving operational statistics of a satellite terminal of a peer group of satellite terminals, the operational statistics including a first operational statistic for a first parameter of the satellite terminal and a second operational statistic for a second parameter of the satellite terminal;

converting the first operational statistic into a first normalized operation statistic that is normalized to the peer group;

converting the second operational statistic into a second normalized operation statistic that is normalized to the peer group;

determining a first normalized deviation of the first normalized operational statistic;

determining a second normalized deviation of the second normalized operational statistic;

comparing the first normalized deviation to at least a first threshold deviation;

comparing the second normalized deviation to at least a second threshold deviation; and determining a first diagnosis zone based on the first normalized deviation and the second normalized deviation, the first diagnosis zone corresponding to a problem signature; and diagnosing the satellite terminal with a problem defined by the problem signature based on the determined first diagnosis zone.

2. The method of claim 1, wherein the first normalized deviation and the second normalized deviation are plotted on a two dimensional diagram having a plurality of diagnosis zones for visual interpretation.

3. The method of claim 1, wherein a plurality of problem signatures are stored in a problem signature library.

4. The method of claim 1, wherein the first diagnosis zone is represented in two dimensions corresponding to the first and second normalized deviations.

5. The method of claim 1, wherein the first diagnosis zone is represented in at least three dimensions corresponding to at least three normalized deviations.

6. The method of claim 1, wherein the problem signature includes the first diagnosis zone and a second diagnosis zone which corresponds to operation statistics different from the first operational statistic and the second operational statistic.

7. The method of claim 1, wherein operational statistics include at least a reception power, a transmission power, an uplink signal to noise ratio, a downlink signal to noise ratio, an uplink error rate, a downlink error rate, a throughput value, and a latency value.

8. The method of claim 1, wherein the problem is diagnosed as one of degraded and bad.

9. The method of claim 1, wherein diagnosing the satellite terminal includes indicating a level of confidence of the diagnosed problem.

10. The method of claim 1, wherein the first normalized deviation is an uplink signal to noise ratio and the second normalized deviation is a downlink signal to noise ratio.

11. The method of claim 1, wherein determining the first diagnosis zone includes determining that coordinates of the first normalized deviation and the second normalized deviation are within the first diagnosis zone.

12. The method of claim 1, wherein determining the first diagnosis zone includes comparing a ratio based on the first normalized deviation and the second normalized deviation to a threshold ratio.

13. The method of claim 1, wherein determining the first diagnosis zone includes comparing a differential of the first normalized deviation and the second normalized deviation to a threshold differential.

14. A system comprising:
a non-transitory computer readable medium storing satellite profile information; and
at least one processing device operably coupled to the non-transitory computer readable medium, the at least one processing device executing instructions to:
receive operational statistics of a satellite terminal of a peer group of satellite terminals, the operational statistics including a first operational statistic for a first parameter of the satellite terminal and a second operational statistic for a second parameter of the satellite terminal;
convert the first operational statistic into a first normalized operation statistic that is normalized to the peer group;
convert the second operational statistic into a second normalized operation statistic that is normalized to the peer group;
determine a first normalized deviation of the first normalized operational statistic;
determine a second normalized deviation of the second normalized operational statistic;
compare the first normalized deviation to at least a first threshold deviation;
compare the second normalized deviation to at least a second threshold deviation; and
determine a first diagnosis zone based on the first normalized deviation and the second normalized deviation, the first diagnosis zone corresponding to a problem signature; and
diagnose the satellite terminal with a problem defined by the problem signature based on the determined first diagnosis zone.

15. The system of claim 14, wherein the first normalized deviation and the second normalized deviation are plotted on a two dimensional diagram having a plurality of diagnosis zones for visual interpretation.

16. The system of claim 14, wherein a plurality of problem signatures are stored in a problem signature library.

17. The system of claim 14, wherein the first diagnosis zone is represented in two dimensions corresponding to the first and second normalized deviations.

18. The system of claim 14, wherein the first diagnosis zone is represented in at least three dimensions corresponding to at least three normalized deviations.

19. The system of claim 14, wherein the problem signature includes the first diagnosis zone and a second diagnosis zone which corresponds to operation statistics different from the first operational statistic and the second operational statistic.

20. The system of claim 14, wherein operational statistics include at least a reception power, a transmission power, an uplink signal to noise ratio, a downlink signal to noise ratio, an uplink error rate, a downlink error rate, a throughput value, and a latency value.

21. The system of claim 14, wherein the problem is diagnosed as one of degraded and bad.

22. The system of claim 14, wherein diagnosing the satellite terminal includes indicating a level of confidence of the diagnosed problem.

23. The system of claim 14, wherein the first normalized deviation is an uplink signal to noise ratio and the second normalized deviation is a downlink signal to noise ratio.

24. The system of claim 14, wherein determining the first diagnosis zone includes determining that coordinates of the first normalized deviation and the second normalized deviation are within the first diagnosis zone.

25. The system of claim 14, wherein determining the first diagnosis zone includes comparing a ratio based on the first normalized deviation and the second normalized deviation to a threshold ratio.

26. The system of claim 14, wherein determining the first diagnosis zone includes comparing a differential of the first normalized deviation and the second normalized deviation to a threshold differential.

* * * * *